United States Patent [19]
Hill

[11] 3,894,244
[45] July 8, 1975

[54] POWER LIMIT AND CONTROL SYSTEM
[76] Inventor: Ross K. Hill, 7752 Hammerly, Houston, Tex. 77055
[22] Filed: Oct. 3, 1973
[21] Appl. No.: 403,323

[52] U.S. Cl. .................................. 307/16; 307/84
[51] Int. Cl. ............................................ H02j 3/00
[58] Field of Search ............ 307/11, 12, 16, 31, 35, 307/39, 86, 84, 43, 38

[56] References Cited
UNITED STATES PATENTS
3,294,978  12/1966  Billings et al. .................... 307/86 X
3,619,635  11/1971  Thompson et al. .................... 307/11
3,792,325  2/1974   Berger ................................. 307/24

*Primary Examiner*—Robert K. Schaefer
*Assistant Examiner*—M. Ginsburg
*Attorney, Agent, or Firm*—Pravel & Wilson

[57] ABSTRACT

A new and improved power limit and control system for determining the power output capability of a group of power sources and limiting the power drawn by a number of loads driven by the power sources to the power capabilities of the sources.

14 Claims, 3 Drawing Figures

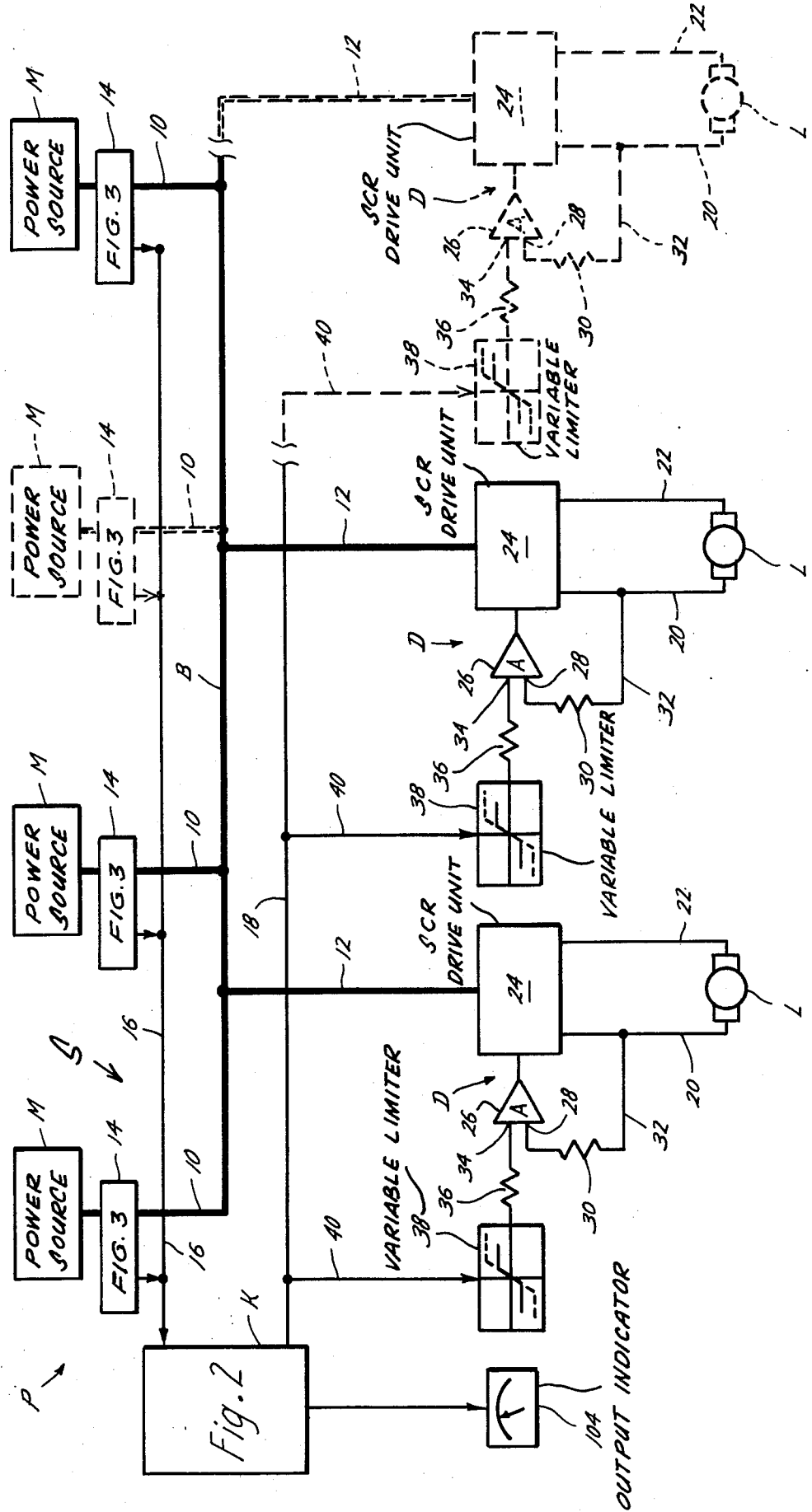

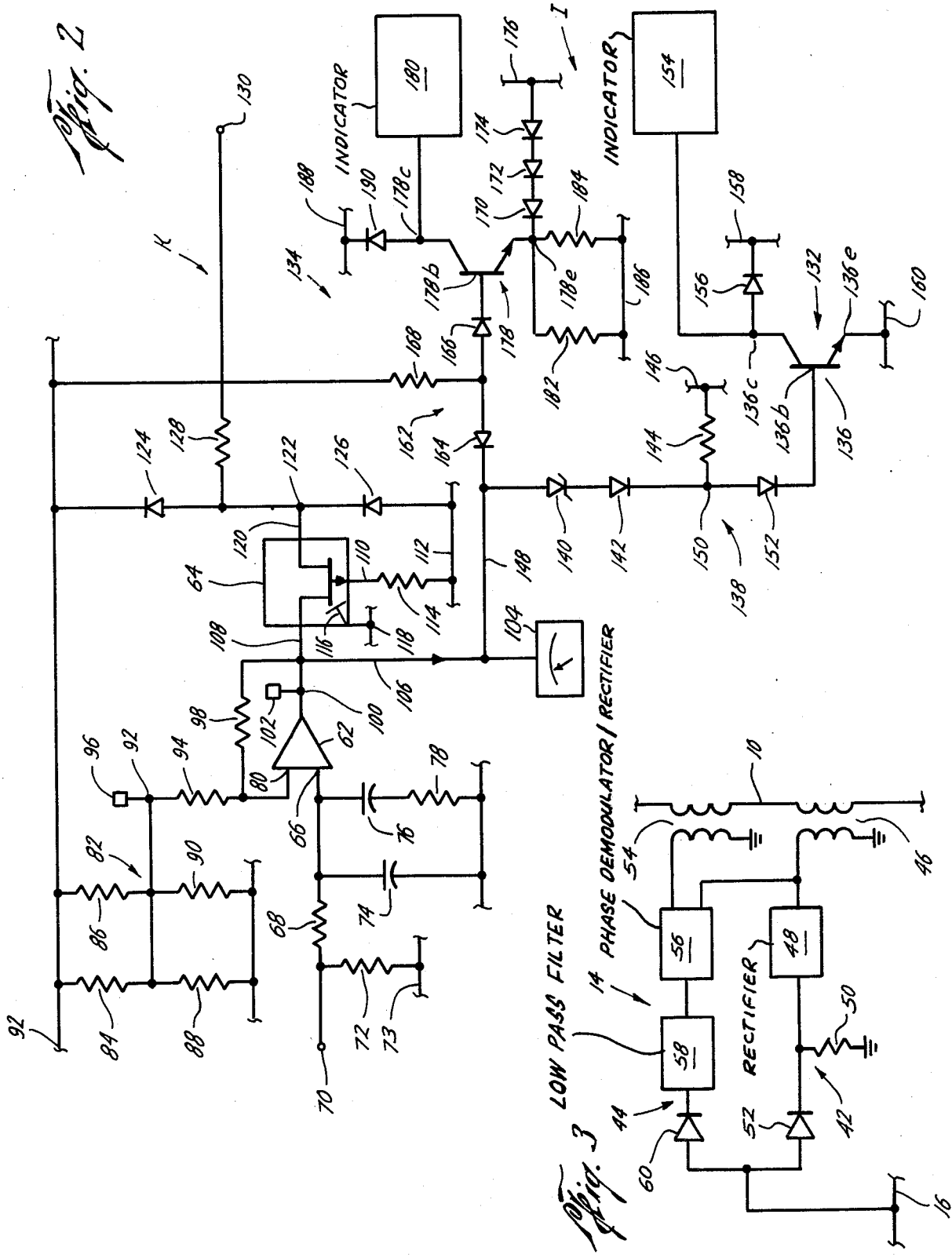

POWER LIMIT AND CONTROL SYSTEM

BACKGROUND OF THE INVENTION

1. Field of the Invention

The present invention relates to power limit and control systems and the like.

2. Description of Prior Art

In situations where a number of independent loads were being powered by a group of power sources, there have been two conflicting power coordination requirements. If more prime movers were activated than were required to feed the existing loads, then the prime movers ran very lightly loaded, causing an increase in fuel consumption and an increase in prime mover maintenance cost, particularly if turbines or reciprocating engines were the prime movers. On the other hand, if fewer power sources were activated than would be required to power the load, the power source overload circuits tripped either the power sources or the loads off the line, resulting in a total loss of power to one or all of the loads.

Specifically, on oil drilling rigs on land or offshore, a group of AC engine-generator or turbine-generator sets has provided the prime source of power, making it important to minimize the number of prime movers which were running under any particular load condition. However, for this to be done, the risk of shutting down the complete rig from time to time due to momentary overloads had to be taken into account. An extra prime mover was often kept running, in order to prevent a momentary overload from tripping the power sources or loads off the line.

SUMMARY OF THE INVENTION:

Briefly, the present invention provides a new and improved power limit system and method for monitoring the power capability of a group of power sources and limiting the power drawn from such sources by plural loads, which have drive control circuits therewith, to a magnitude within the capabilities of such sources.

A comparator compares the power output presently being drawn from the power sources with a predetermined reference power level. A control means responds to the output of the comparator and energizes the drive control circuits of the plural loads to limit the power drawn from the group of power sources to a magnitude within the output capabilities of the power source.

A sensor determines the most heavily loaded of the power sources and forms a signal, indicating the output of this source. The signal so formed is provided to the comparator for comparison with the reference power level.

It is an object of the present invention to provide a new and improved power limit and control system.

It is an object of the present invention to provide a new and improved power limit and control method.

BRIEF DESCRIPTION OF THE DRAWINGS

FIG. 1 is a schematic diagram of the system of the present invention;

FIG. 2 is a schematic electrical circuit diagram of a control circuit in the system of FIG. 1; and FIG. 3 is a schematic electrical circuit diagram of a sensor circuit of FIG. 1.

DESCRIPTION OF THE PREFERRED EMBODIMENT

In the drawings, the letter P designates generally the power limit system of the present invention for monitoring the power output capability of a plurality of power sources or prime movers M. The power sources M may be, for example, a set of turbine generators, a set of engine-generators, a set of electric motor generators, or a set of alternating current power transformers. The power limit system P limits the power drawn from the sources M by a plurality of loads L. The number of loads L being driven at a particular time varies in accordacne with the equipment operating conditions, and thus one of the loads L is shown in phantom in the accompanying drawings (FIG. 1). Further, the number of power sources M driving the loads L at a particular time typically varies, since the number of prime movers is preferably kept as low as possible, taking into account possible momentary overloads, and thus one of the power sources M is shown in the accompanying drawings (FIG. 1).

Since the power sources M are conventional and may be any of the types set forth above, they are shown schematically in the accompanying drawings.

Each of the power sources M is electrically connected by an output electrical conductor 10 to a power common bus B. Each of the loads L is electrically connected to the power common bus B by a supply conductor 12.

A sensor circuit S including a plurality of individual sensing circuits 14 (FIGS. 1 and 3), each associated with a single power source M, sense the most heavily loaded of the plural power sources M in a manner to be set forth below.

As has been set forth above, the number of power sources M connected to and furnishing power to the power common bus B, as well as the number of loads L connected to and drawing power from the bus B, at a particular time varies as indicated by the power source M and the load L shown in phantom in the drawings.

A common input conductor 16 electrically connects the output of the sensing circuits 14 of the sensor S to a power limit and control circuit K of the present invention (FIGS. 1 and 2). As will be set forth below, the power limit and control circuit K monitors the power capability of the power sources M and limits the power drawn therefrom by the plural loads L. The power limit and control circuit k provides an output signal on an output conductor 18 to the loads L to limit the power drawn from the sources M by the loads L to a magnitude within the capabilities of these sources M.

Considering the loads L more in detail, a plurality of supply conductors 20 and 22 supply operating power to the load L under control of a drive control circuit D (FIG. 1). The drive control circuit D includes a current limit circuit 24, typically a silicon controlled rectifier (SCR) drive unit which controls the current flowing to the load L through the supply conductors 20 and 22 in response to a control signal from a control amplifier 26. The current limiting SCR drive unit 24 is conventional and the details thereof are not shown in the drawings in order to preserve clarity therein.

A first input terminal 28 of the control amplifier 26 receives a control signal indicative of the current flowing in the supply conductor 20 from a resistor 30 electrically connected by a conductor 32 to the conductor 20.

A second input terminal 34 of the control amplifier 26 receives a control signal through a connecting resistor 36 from a variable limiter circuit 38. The variable limiter circuit 38 is a conventional circuit responding to the magnitude of the signal present on the output conductor 18 from the power limit and control circuit K. The signal on conductor 18 is furnished over an input conductor 40 to the limiter 38, causing the limiter 38 to provide an output signal whose magnitude varies in accordance with the amplitude of the signal present on the input conductor 40. The schematic symbol for the variable limiter 38 is of the type well-known in the art. Since the variable limiter 38 is conventional, details thereof are not shown in the drawings in order to preserve clarity therein.

The drive control circuit D thus limits the current drawn by load L in the current limit SCR drive unit 24 in response to the output signal from the power limit and control circuit K on the conductor 18 and in response to the current present on the supply conductor 20 to the load L, as is conventional.

Considering the sensing circuit 14 of the sensor S more in detail (FIG. 3), a current sensing circuit 42 senses the output current from the power source M with which such sensing circuit is associated, while a kilowatt sensing circuit 44 in the sensing circuit 14 senses the kilowatt output of the power source M with which the sensing circuit 14 is associated.

A current transformer 46 of the current sensing circuit 42 decreases the high current level present on the conductor 10 to a suitable low level and provides this low level current signal to a rectifier 48 in the current sensing circuit 42. The rectifier 48 forms a direct current signal whose magnitude is determined by the magnitude of the alternating current signal supplied thereto from the current transformer 46. A ground return resistor 50 provides a path for the direct current output of the rectifier 48 in the event a diode 52 in the current sensing circuit 42 is not conducting. As will be set forth below, the diode 52 in the sensing circuit 14 is conducting when the current present on the output conductor 10 for the power source M with which such sensing circuit is associated is higher than the current and power output from the other sensing circuit in the system P.

A transformer 54 of the kilowatt sensing circuit 44 senses the line-to-neutral voltage of the power source M with which the sensing circuit 14 is associated.

A phase demodulator-rectifier 56 receives the output of the transformer 54 representing the line-to-neutral voltage of the power source M, as well as the output of the transformer 46 representing the current output of the power source M. The phase demodulator/rectifier 56 forms an output DC signal which is the product of the input signals and the phase angle cosine therebetween and thus proportional to the kilowatt output of the power source M, since the product of the current output, line-to-neutral voltage output and phase angle cosine represents the kilowatt output of the power source M.

A low pass filter 58 is electrically connected to the output of the phase demodulator/rectifier 56 and passes the slowly varying direct current signal output from the phase demodulator/rectifier 56 while filtering out undesirable higher frequency components. A diode 60 is connected to the output of the low pass filter 58 and electrically connects the kilowatt sensing circuit 44 to the output conductor 16.

Each of the sensing circuits 14 associated with the power source M is connected to the output conductor 10 of such power source M and to the conductor 16 in common. The diode 52 in the current sensing circuit 42 and the diode 60 in the kilowatt sensing unit 44 in each sensing circuit 14 of the sensor S are thus connected in common to the conductor 16. The particular one of these diodes in the sensor S receiving the highest level input signal is biased into conduction, reverse biasing the remaining diodes. Thus, the power source M which is most heavily loaded, due either to the current output is most heavily loaded, due either to the current output or the kilowatt output of the power source M present on the conductor 10, respectively, is sensed in the sensing circuits 14 of the sensor S. In this manner, the most heavily loaded of the power sources M, whether due to the current output or the kilowatt output, is sensed in the sensor S.

The magnitude of the direct current signal present on the conductor 16 from the conducting diode in the sensing circuit 14 receiving the highest level direct current signal also indicates the magnitude of the power output from the most heavily loaded of the plural power sources M. In this manner, the sensor S forms a signal indicating the magnitude of the power output from the most heavily loaded of the plural power sources M which is provided over the conductor 16 to the power limit and control circuit K.

Considering the power limit and control circuit K more in detail (FIG. 2), the control circuit K includes a comparator amplifier 62 and a control switch 64 which limit, in a manner to be set forth below, the power drawn from the power sources M to a magnitude within the output capabilities of such sources. The comparator amplifier 62 compares the power output of the power sources M, as sensed in the the sensor S, with a reference power level. The control switch 64 responds to the output of the comparator amplifier 62 and energizes the drive control circuits D of the loads L to limit the power drawn from the power sources M to a magnitude within the output capabilities of such sources. The comparator amplifier 62 receives an input signal at an input terminal 66 from an input resistor 68. The input resistor 68 is electrically connected at a terminal 70 to the conductor 16 so that the comparator amplifier 62 receives the output signal of the sensor S indicating the most heavily loaded of the power sources M, formed in the manner set forth above. A bias resistor 72 electrically connects the terminal 70 to a substantial negative DC bias at a bus 73 so that the diodes in the sensing circuits 14 can conduct properly.

An input filter including parallel-connected capacitors 74 and 76 and a resistor 78 connected in series with the capacitor 76 are electrically connected at the input terminal 66 of the comparator amplifier 62 to isolate the amplifier 62 from undesirable and unwanted noise present in the system P.

The comparator amplifier 62 further receives a signal at an imput terminal 80 from a reference level establishing circuit 82. The reference level establishing circuit 82 is in the form of a resistance network including a resistor 84, a resistor 86, a resistor 88 and a resistor 90. The resistor network of the reference level establishing circuit 82 is electrically connected with a positive DC power supply or reference bus 92. Any suitable source of direct current power may be used to energize the bus 92 and the bus 73.

The resistance values of the resistors 84, 86, 88 and 90 in the resistance network of the reference level establishing circuit 82 are chosen so that the voltage drop thereacross establishes a reference potential at a terminal 92 corresponding, less the voltage drop across a resistor 94, to the signal present at input terminal 70 when one of the power sources M is providing power at or near its power output capability. A test point 96 is provided at the terminal 92 for testing and calibration purposes.

The resistor 94 electrically connects the terminal 92 to the input terminal 80 of the comparator amplifier 62, so that the comparator amplifier 62 thus compares the power output of the power sources with a reference power level.

A feedback resistor 98 electrically connects an output terminal 100 of the comparator amplifier 62 to the reference level input terminal 80 to control the level of the output signal to an appropriate level compatible with the variable limiter circuits 38 in the drive control circuits D of the loads L (FIG. 1). A test point 102 is provided at the output terminal 100 of the comparator amplifier 62 for testing and calibration purposes. A suitable output indicator 104 (FIGS. 1 and 2) is electrically connected by a conductor 106 to the output terminal 100 of the comparator amplifier 62 for monitoring and control purposes.

The control switch 64 is in the preferred embodiment a field effect transistor (FET) although it should be understood that other switching means such as other semiconductors or relays are also suitable for use in the present invention. The control switch 64 is electrically connected at a source terminal 108 to the output terminal 100 of the comparator amplifier 62. A gate terminal 110 of the control switch 64 is electrically connected to a negative bias bus 112 by a bias resistor 114. A case terminal 116 of the control switch 64 is electrically grounded at a terminal 118. A drain terminal 120 of the control switch 64 provides an output signal at a terminal 122 in response to the output of the comparator 62 in order to energize the drive control circuits D of the loads L to limit the power drawn from the sources M to a magnitude within the output capabilities of the sources M. Clamping diodes 124 and 126 limit the potential variations at the terminal 122. A coupling resistor 128 provides the signal present at the terminal 122 to an ouput terminal 130 electrically connected to the output conductor 18 so that the signal formed in the control circuit K is provided to the drive control circuits D as has been set forth.

During normal equipment operation, the potential of the output terminal 130, for example, is −10 volts DC. When one or more of the sources M approaches or nears the limit of its power output capabilities, the control circuit K operates in a "power limit" mode with a typical output potential between −2 and 0 volts DC.

It is to be noted that with the control switch 64 in the manner set forth above, a failure of bias potential to the control circuit K does not cause disconnection of the power sources M from the loads L. Rather the potential at the terminal 122 is allowed to fluctuate, or float, due to the de-energization of the gate terminal 110 of the switch 64, thereby permitting continuing supply of power from the power sources M to the loads L, without an undesirable interruption in the supply of power to the loads L.

A monitor limit indicator circuit I provides an indication to the user of the power sources M and the loads L when the load L are drawing power above an established power threshold. In the preferred embodiment, a first monitor limit indicator circuit 132 and a second monitor limit indicator circuit 134 are used. The first monitor limit indicator circuit 132 indicates when the plural loads L are drawing power above a first threshold power level, which is some predetermined fraction, such as one-half power output capability of the sources M. The second monitor limit indicator circuit 134 indicates when the plural loads L are drawing power above a second threshold power level which is close to the power output capabilities of the power sources M, for example, 95 percent.

In this manner, an operator of the system P is notified by the absence of a signal from the first monitor limit indicator 132 when the power sources M are operating inefficiently, below some predetermined fraction of their power output capabilities, so that unnecessary power sources M can be taken off-line. Further, the operator is notified by presence of a signal from the second monitor limit indicator 134 when the power sources M are operating at near their power output capabilities, so that an additional power source M can be started and electrically connected to the power common bus B to provide additional power to the loads L.

Considering the monitor limit indicator circuit I more in detail, the first monitor limit indicator circuit 132 is energized by a first switch or transistor 136 when a first threshold circuit 138 activates the first switch 136 when the power drawn by the plural loads L exceeds the first power threshold.

The threshold circuit 138 of the first monitor limit indicator circuit 132 includes a Zener diode 140, a diode 142 and a bias resistor 144 electrically connected to a positive direct current bias conductor 146. The Zener diode 140 is electrically connected by a conductor 148 and the conductor 106 to output terminal 100 of the comparator amplifier 62.

The Zener diode 140 has a predetermined voltage drop thereacross forcing the potential at a terminal 150 to be a predetermined voltage positive with respect to the output 100 of the amplifier 62. The magnitude of the voltage drop across the Zener diode 140 is chosen to be of a value such that the voltage present at the output 100 of the comparator amplifier 62 when the power sources M are operating above the predetermined fraction of their power level, the first power threshold level, taken in conjunction with the voltage drop across the Zener diode 140 is sufficient to bias a base terminal 136b of the transistor 136 positive through a diode 152. This bias of the base terminal 136b causes the transistor 136 to conduct, permitting current to flow through a lamp, buzzer, or other suitable indicator means 154, indicating that the loads L are drawing power above the first power threshold level. A collector terminal 136c of the transistor 136 is electrically connected by a diode 156 to a direct current bias bus 158 while an emitter terminal 136e of the transistor 136 is electrically connected to a ground potential at a bus 160.

A second threshold circuit 162 of the second monitor limit indicator circuit 134 includes diodes 164 and 166 connected to a positive direct current bias on the bus 92 through a resistor 168.

A plurality of diodes, including a diode 170, a diode 172 and a diode 174 are electrically connected in series between a ground bus 176 and emitter terminal 178e of a transistor 178. The diodes 170, 172 and 174 bias the emitter terminal 178e of the transistor 178 to a point where the transistor 178 is not biased into conduction until the voltage present at the output 100 of the comparator amplifier 62 has reached a level corresponding to the second power threshold level at or near the power output capabilities of the power sources M then operating. When the output of the comparator amplifier 62 reaches such a level, the transistor 178 is biased into conduction at a base terminal 178b by the signal through the diode 164, permitting current to flow to a second monitor level indicator 180 indicating that the power sources M are operating at or near their power output capabilities.

The equipment operator may then take necessary corrective action by energizing one or more additional power sources M and electrically connecting these sources M to the power common bus B, or removing and electrically disconnecting one or more loads L from the bus B.

A pair of parallel connected resistors 182 and 184 electrically connect the emitter 178e of the transistor 178 to a negative bias bus 186. A collector terminal 178c of the transistor 178 is electrically connected to a positive bias bus 188 through a diode 190 so that the transistor 178 may be biased into conduction at the proper time upon receipt of a signal at the base terminal 178b in the manner set forth above.

In the operation of the present invention, the equipment operator energizes the anticipated requisite number of power sources M to drive the loads L at a satisfactory operating level. The power sources M provide operating power over the power common bus B to the load L in the manner set forth above. While the power sources M are providing such power, there are two factors which typically cause one of the power sources M to trip off-line. These two factors are excess horsepower being drawn beyond the power output capability of the power source M or excess amperage being drawn from the power source M causing the circuit breaker therein to trip.

The sensor S including the sensing circuits 14 associated with each of the power sources M monitors the generator kilowatt output and the generator amperage for each of the power sources M, determining which of the power sources M is the most heavily loaded, whether such loading is in the form of current output or kilowatt output. The signal representing the most heavily loaded of the power sources M, and the amount of such loading, is provided at the conductor 18 to the control circuit K where it is compared with the reference power level, and the difference therebetween is amplified in the comparator amplifier 62. The output of the comparator amplifier 62 is then furnished through the control switch 64 over the conductor 18 to the conductors 40 and variable limiters 38 in order to control the drive control circuits D of the loads L and limit the current drawn by the loads L.

During normal equipment operation, the potential of the output terminal 130, for example, is −10 volts DC. When one or more of the sources M approaches or nears the limit of its power output capabilities, the control circuit K operates in a "power limit" mode with a typical output potential between −2 and 0 volts DC. In this manner, the power limit and control system P of the present invention limits the total load imposed upon the power sources M by the loads L so that the most heavily loaded power source M does not exceed the power output level set by the reference power level input signal to the comparator amplifier 62.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

I claim:

1. A power limit system for limiting the power drawn from a plurality of power sources by a plurality of loads, each of the loads having drive control circuits therewith, to a magnitude within the output capabilities of such sources, comprising:
   a. sensor means for sensing the most heavily loaded of the plurality of power sources, said sensor means comprising:
      1. Current sensor means for sensing the current output from the plurality of power sources; and
      2. Kilowatt sensor means for sensing the kilowatt output from the plurality of power sources.
   b. comparator means for comparing the output of said sensor means with a reference power level; and
   c. control means responsive to said comparator means for energizing the drive control circuits of the loads to limit the power drawn from the group of power sources to a magnitude within the output capabilities of the power sources.

2. The system of claim 1, wherein said current sensor means comprises:
   means for sensing the largest current output from the plurality of power sources.

3. The system of claim 1, wherein said kilowatt sensor means comprises:
   means for sensing the largest kilowatt output from the plurality of power sources.

4. The system of claim 1, wherein said sensor means comprises:
   means for forming a signal indicating the magnitude of the power output from the most heavily loaded of the plurality of power sources.

5. The system of claim 1, further including:
   means for establishing a predetermined reference power level.

6. The system of claim 1, further including:
   output indicator means for indicating the output of said comparator means.

7. The system of claim 1, further including:
   monitor limit indicator means for indicating when the plurality of loads are drawing power above a power threshold.

8. The system of claim 7, wherein said monitor limit indicator means includes:
   switch means for energizing said monitor limit indicator means.

9. The system of claim 8, wherein said monitor limit indicator means further includes:
   threshold means for activating said switch means when the power drawn by the plurality of loads exceeds the power threshold.

10. The system of claim 1, further including:

a. first monitor limit indicator means for indicating when the plurality of loads are drawing power above a first threshold level; and
b. second monitor limit indicator means for indicating when the loads are drawing power above a second threshold level.

11. The system of claim 10, wherein:
a. said first monitor limit indicator means includes switch means for energizing said first monitor limit indicator means; and
b. said second monitor limit indicator means includes switch means for energizing said second monitor limit indicator means.

12. The system of claim 11, wherein:
a. said first monitor limit indicator means includes threshold means for activating said switch means when the power drawn by the plurality of loads exceeds the first power threshold; and
b. said second monitor limit indicator means includes said threshold means for activating said switch means when the power drawn by the plurality of loads exceeds the second power threshold.

13. A method of monitoring the power capability of a group of power sources having drive control circuits and limiting the power drawn from such sources to a magnitude within the capabilities of such sources, comprising the steps of:
a. sensing the most heavily loaded of the power sources, said step of sensing comprising the steps of:
  1. sensing the current output from the sources;
  2. sensing the kilowatt output from the sources;
b. comparing the power output of the most heavily loaded of the power sources with a reference power level; and
c. energizing the drive control circuits of the loads to limit the power drawn from the group of power sources to a magnitude within the output capabilities of the power sources when the reference power level is reached.

14. The method of claim 13, wherein said steps of sensing comprise the steps of:
a. sensing the largest current output from the sources; and
b. sensing the largest kilowatt output from the sources.

* * * * *